(12) United States Patent
Shidai

(10) Patent No.: US 11,001,149 B2
(45) Date of Patent: May 11, 2021

(54) MASTER ELECTRONIC CONTROL DEVICE FOR VEHICLE, SLAVE ELECTRONIC CONTROL DEVICE FOR VEHICLE, LOG COLLECTION SYSTEM FOR VEHICLE, AND STORAGE MEDIUM

(71) Applicant: DENSO CORPORATION, Kariya (JP)

(72) Inventor: Takahiro Shidai, Kariya (JP)

(73) Assignee: DENSO CORPORATION, Kariya (JP)

( * ) Notice: Subject to any disclaimer, the term of this patent is extended or adjusted under 35 U.S.C. 154(b) by 260 days.

(21) Appl. No.: 16/286,850

(22) Filed: Feb. 27, 2019

(65) Prior Publication Data
US 2019/0275891 A1  Sep. 12, 2019

(30) Foreign Application Priority Data
Mar. 9, 2018 (JP) ................. JP2018-43482

(51) Int. Cl.
*B60L 3/12* (2006.01)
*H04L 29/08* (2006.01)
*G07C 5/00* (2006.01)

(52) U.S. Cl.
CPC ............. *B60L 3/12* (2013.01); *G07C 5/008* (2013.01); *H04L 67/125* (2013.01)

(58) Field of Classification Search
CPC ......... B60L 3/12; H04L 67/125; G07C 5/008; G07C 5/0841

USPC .......................................................... 701/22
See application file for complete search history.

(56) References Cited

U.S. PATENT DOCUMENTS

2012/0235483 A1 * 9/2012 Rigby ................. H01M 10/633
307/29

FOREIGN PATENT DOCUMENTS

| JP | 02004193799 A | * | 7/2004 |
|---|---|---|---|
| JP | 2010-173615 A |   | 8/2010 |
| KR | 2012010693 | * | 2/2012 |
| WO | WO-9945255 | * | 9/1999 |

* cited by examiner

*Primary Examiner* — Muhammad Shafi
(74) *Attorney, Agent, or Firm* — Harness, Dickey & Pierce, P.L.C.

(57) ABSTRACT

A master electronic control device for a vehicle is provided as follows. A vehicle time, which is managed by the master electronic control device to be used in common with a slave electronic control device, is transmitted to the slave electronic control device. Device log information is received from the slave electronic control device, the device log information including (i) a content of an event in the slave electronic control device, (ii) a device time in the slave electronic control device when the event is detected, and (iii) information on vehicle time reception state. The device time included in the device log information is converted into the vehicle time that corresponds to the device time in response to that the information on vehicle time reception state indicates that, when the event is detected, the slave electronic control device has not received the vehicle time.

14 Claims, 13 Drawing Sheets

IN MASTER

| No. | EVENT | | | GLOBAL TIME | VEHICLE TIME | GLOBAL TIME CONVERT | VEHICLE LOG TRANSMIT |
|---|---|---|---|---|---|---|---|
| | DEVICE | CONTENT | DATA | | | | |
| 1 | MASTER | IG-ON | — | 0xFFFFFFFF | 0x00001001 | NOT-CONVERTED | NOT-TRANSMITTED |
| 2 | | | | | | | |
| 3 | | | | | | | |

IN SLAVE

| No. | EVENT | | | DEVICE TIME | VEHICLE TIME RECEIVE | DEVICE LOG TRANSMIT |
|---|---|---|---|---|---|---|
| | DEVICE | CONTENT | DATA | | | |
| 1 | SLAVE1 | TIME-TAMPER | ERROR | 0x00000010 | NOT-RECEIVED | NOT-TRANSMITTED |
| 2 | SLAVE1 | B_MAC ERROR | ERROR | 0x00001020 | RECEIVED | NOT-TRANSMITTED |

IN SLAVE

| No. | EVENT | | | DEVICE TIME | VEHICLE TIME RECEIVE | DEVICE LOG TRANSMIT |
|---|---|---|---|---|---|---|
| | DEVICE | CONTENT | DATA | | | |
| 1 | SLAVE1 | TIME-TAMPER | ERROR | 0x00000010 | NOT-RECEIVED | TRANSMITTED |
| 2 | SLAVE1 | B_MAC ERROR | ERROR | 0x00001020 | RECEIVED | TRANSMITTED |

IN MASTER

| No. | EVENT | | | GLOBAL TIME | VEHICLE TIME | GLOBAL TIME CONVERT | VEHICLE LOG TRANSMIT |
|---|---|---|---|---|---|---|---|
| | DEVICE | CONTENT | DATA | | | | |
| 1 | MASTER | IG-ON | - | 0xFFFFFFFF | 0x00001001 | NOT-CONVERTED | NOT-TRANSMITTED |
| 2 | SLAVE1 | TIME-TAMPER | ERROR | 0xFFFFFFFF | 0x00001011 | NOT-CONVERTED | NOT-TRANSMITTED |
| 3 | SLAVE1 | B_MAC ERROR | ERROR | 0xFFFFFFFF | 0x00001020 | NOT-CONVERTED | NOT-TRANSMITTED |

_US 11,001,149 B2_

MASTER ELECTRONIC CONTROL DEVICE FOR VEHICLE, SLAVE ELECTRONIC CONTROL DEVICE FOR VEHICLE, LOG COLLECTION SYSTEM FOR VEHICLE, AND STORAGE MEDIUM

CROSS REFERENCE TO RELATED APPLICATION

The present application claims the benefit of priority from Japanese Patent Application No. 2018-43482 filed on Mar. 9, 2018. The entire disclosure of the above application is incorporated herein by reference.

TECHNICAL FIELD

The present disclosure relates to a master electronic control device for a vehicle, a slave electronic control device for a vehicle, a log collection system for a vehicle, and a storage medium.

BACKGROUND

A system called SIEM (Security Information and Event Management) that detects attacks from crackers or the like by collecting and analyzing operation logs of servers and/or networks that are included in an information system. It is also known to incorporate STEM as a countermeasure against cyber security in vehicles as well. Further, there has been developed in vehicles a system in which vehicles communicate and cooperate with each other as called connected vehicles. For instance, of the connected vehicles, each vehicle has a plurality of electronic control devices (which may also referred to as ECUs (Electronic Control Units)) with individual clocks are operating, whereas events are arising in the vehicle and are recorded in the respective electronic control devices.

SUMMARY

According to an example of the present disclosure, a master electronic control device for a vehicle is provided as follows. A vehicle time, which is managed by the master electronic control device to be used in common with a slave electronic control device, is transmitted to the slave electronic control device. Device log information is received from the slave electronic control device, the device log information including (i) a content of an event in the slave electronic control device, (ii) a device time in the slave electronic control device when the event is detected, and (iii) information on vehicle time reception state. The device time included in the device log information is converted into the vehicle time that corresponds to the device time in response to that the information on vehicle time reception state indicates that, when the event is detected, the slave electronic control device has not received the vehicle time.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe, with reference to the drawings, configurations and functions of a log collection system 1 for a vehicle, a maser electronic control device 2 for a vehicle, and a slave electronic control device 4 for a vehicle, all of which are according to an embodiment of the present disclosure.

Figure 1:
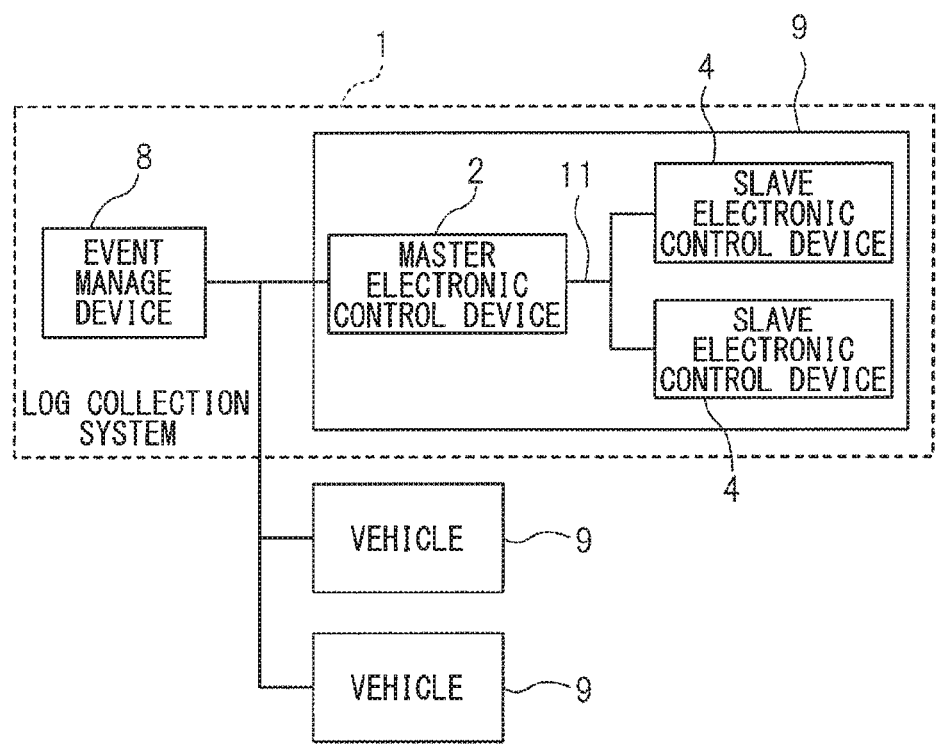
FIG. 1 is a diagram showing an example of a log collection system according to an embodiment of the present disclosure.

As shown in FIG. 1, the log collection system 1 includes a master electronic control device 2, a slave electronic control device 4, and an event management device 8. The master electronic control device 2 and the slave electronic control device 4 are connected via a communication network 11. The master electronic control device 2 may be also referred to as a master ECU (Electronic Control Unit); the slave electronic control device 4 may be also referred to as a slave ECU (Electronic Control Unit). In FIG. 1, although two slave electronic control devices 4 are shown, one slave electronic control device 4 may be provided, or three or more slave electronic control devices 4 may be provided. Further, the present embodiment assumes that two slave electronic control devices 4 have the same configuration to be described below. Although the following description will be mainly made for the (single) slave electronic control device 4, it may be naturally applied to each of the two slave electronic control devices 4 in FIG. 1. In addition, the master electronic control device 2 is communicatively connected to the event management device 8. In the present embodiment, the master electronic control device 2 and the slave electronic control device 4 are arranged in a vehicle 9, and the event management device 8 is arranged to be external to the vehicle 9. However, the event management device 8 may also be arranged in the vehicle 9; alternatively, any event management device 8 may not be provided in the system 1. Further, the event management device 8 may be communicatively connected to a plurality of vehicles 9 each having the equivalent configuration. Here, the communication connection between the devices 2, 4, 8 may be wired or wireless.

The master electronic control device 2 manages a vehicle time that is used in common with the slave electronic control device 4. In contrast, the slave electronic control device 4 manages a device time which is an individual device time. That is, the device time is specific or unique to the slave electronic control device 4 itself. The device log information, which is log information of an event generated in an individual slave electronic control device 4, is stored in the individual slave electronic control device 4; the stored device log information is thereafter collected and stored in the master electronic control device 2 as the vehicle log information. The vehicle log information stored in the master electronic control device 2 is gathered together with the vehicle log information of the other vehicles 9 into the event management device 8. Note that "information" may be used as being countable as well as uncountable and be equivalent to "an information item." Thus, "a plurality of information" or "a plurality of information(s)" may be used to be equivalent to "a plurality of information items."

In the present disclosure, the master electronic control device 2, the slave electronic control device 4, and the event management device 8 may be each configured to include a control circuit (or controller) containing a plurality of sections (to be described below) to provide respective functions. Such a control circuit may further include (i) memory (storage) containing a nonvolatile storage and/or a volatile storage, (ii) interfaces connected to an external source, and (iii) an internal bus connecting the foregoing components to each other and may be combined with another control circuit. In addition, the sequence diagram and flowcharts (both of which will be described later) similarly each include a plurality of sections (or steps), e.g., represented as S1. Such sections may be included in not only one control circuit but also may be divided to be included in two or more control circuits (i.e., included in at least one control circuit). Several sections may be combined into a single section; each section may be divided into several sections. Each section may be also referred to or achieved as a processor, module, or the like.

Furthermore, an individual one of the sections, processors, or the like included in at least one control circuit, or an individual control circuit of the at least one control circuit may be achieved by using or by including (i) at least one hardware circuit including analog circuit and/or digital circuit, or (ii) at least one processing unit such as a CPU in a computer along with memory storing instructions as a non-transitory tangible computer-readable storage medium storing instructions of program executed by the CPU, or (iii) a combination of the at least one hardware circuit and the at least one processing unit along with memory storing instruction, to thereby provide the functions.

As one example of the present embodiment, the master electronic control device 2, the slave electronic control device 4, and the event management device 8 may be each configured mainly by using a semiconductor device such as an information processing unit or microcomputer having a CPU (Central Processing Unit), memory storing instructions of programs, a network interface connected to a communication network, and an internal bus connecting the foregoing. The memory may include a volatile storage such as a RAM (Random Access Memory), a nonvolatile storage such as a flash memory.

Figure 2:
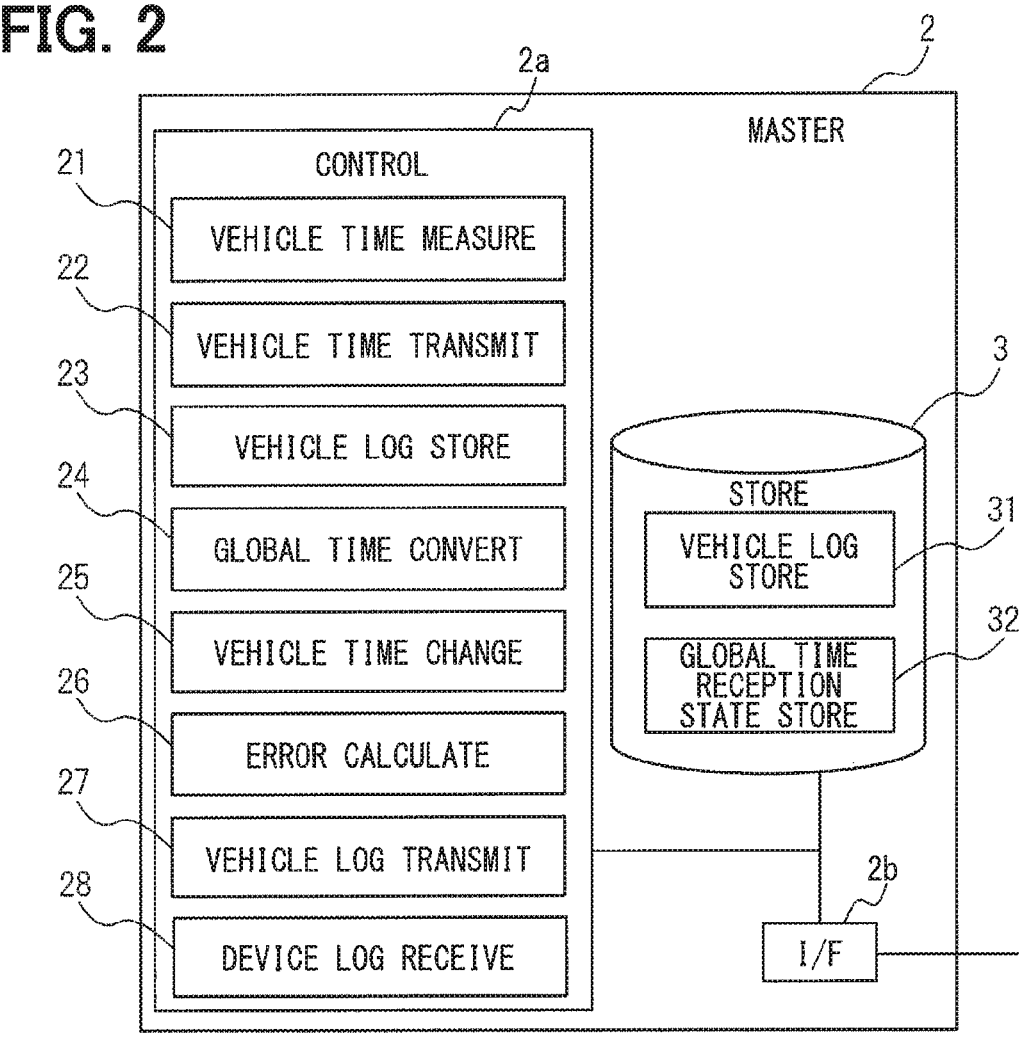
FIG. 2 is a functional block diagram showing a configuration of a master electronic control device.

As shown in FIG. 2, the master electronic control device 2 may include a control circuit 2a (or a controller 2a) having the sections, a master device storage 3, and an interface 2b. The sections for providing the functions include a vehicle time measurement section 21, a vehicle time transmission section 22, a vehicle log information storage section 23, a global time conversion section 24, a vehicle time change section 25, an error calculation section 26, a vehicle log information transmission section 27, and a device log information reception section 28. Further, the master device storage 3 includes a vehicle log information storage 31 and a global time reception state storage 32. Note that a storage may be also referred to as a storage unit.

The vehicle time measurement section 21 is configured to measure a vehicle time (i.e., a vehicle clock time) which is a reference of each electronic control device arranged in the vehicle 9 by using the function of a clock of the master electronic control device 2. The vehicle time transmission section 22 is configured to transmit the vehicle time to the slave electronic control device 4. The device log information reception section 28 is configured to receive device log information. When the received device log information indicates that the vehicle time reception state is still in not-received state, the device log information reception section 28 is configured to convert the device time in the received device log information into a corresponding vehicle time. The device log information, which may be also referred to as a device log or a device log portfolio, includes (i) the contents of an event, (ii) the device time managed by the slave electronic control device 4 when the event is detected (i.e., the device time at detection of the event, or the device time at occurrence of the event), and (iii) the information on vehicle time reception state indicating whether or not the vehicle time has been already received by the slave electronic control device 4 (in received state or in not-received state) when an event is detected.

In response to receiving a global time (which may be also referred to as a wide area time), the global time conversion section 24 is configured (i) to convert the vehicle time of the vehicle log information stored in the vehicle log information storage 31 to the global time based on the received global time, and (ii) to change the global time conversion state to be in converted state. The vehicle time change section 25 is configured to change the vehicle time based on the received global time. The error calculation section 26 is configured to calculate an error between the clock of the global time and the clock of the vehicle time. The calculated error is used, for example, for correction when the time is changed by the vehicle time change section 25 in response to that the global time is received for the first time after the power supply is turned on. The vehicle log information transmission section 27 is configured to transmit the vehicle log information stored in the vehicle log information storage 31 to the event management device 8. Further, the vehicle log information storage 31 stores the vehicle log information including (i) the contents of an event detected by the slave electronic control device 4 and (ii) the vehicle time when the event is detected. The vehicle log information, which may be also referred to as a vehicle log or a vehicle log portfolio. In addition, the global time reception state storage 32 stores a global time reception flag which is the information on global time reception state.

Here, the "vehicle time" signifies a common time used in a plurality of electronic control devices such as ECUs arranged in a vehicle, for example. In the present embodiment, the master electronic control device 2 manages the vehicle time. In contrast, "device time" signifies the time managed by an individual electronic control device such as an ECU. The "global time" (which may be also referred to as a "wide area time") may be a time managed by a server device or the like outside the vehicle, or may be defined as a time managed by a positioning satellite when a device in the vehicle acquires time information directly from a positioning satellite.

As described above, the master electronic control device 2 includes the vehicle time transmission section 22, the device log information reception section 28, and the vehicle log information storage 31, so that the master electronic control device 2 and the slave electronic control device 4 are enabled to record the log information of the event occurring in the vehicle based on the common time information. Further, by including the global time conversion section 24, the occurrence time of each of respective events included in the vehicle log information is enabled to be indicated by the global time managed by an outside source external to a vehicle; therefore, for example, even the respective events occur in a plurality of different vehicles, the log information is enabled to be recorded based on the common time information.

Further, by including the vehicle time change section 25, the vehicle time is enabled to be more accurate to be closer to the global time. Here, the master electronic control device 2 may periodically receive the global time. Further, by including the error calculation section 26, even the occurrence time of the event occurring before the master electronic control device 2 first receives the global time since turning on of the power supply is enabled to be more accurately converted into the global time. For example, suppose a case that the global time cannot be received for a long time after the master electronic control device 2 is activated and the difference in accuracy between the vehicle time and the global time thereby causes a mismatch between the vehicle time and the global time. Such a case may disable the accurate calculation of the global time at the time of activation of the master electronic control device 2 (at the start of vehicle time measurement); however, including of the error calculation section 26 allows the accurate conversion to the global time. Further, including of the vehicle log information transmission section 27 allows recording of a plurality of vehicle log information(s) in a device outside the vehicle on the basis of common time information.

Figure 3:
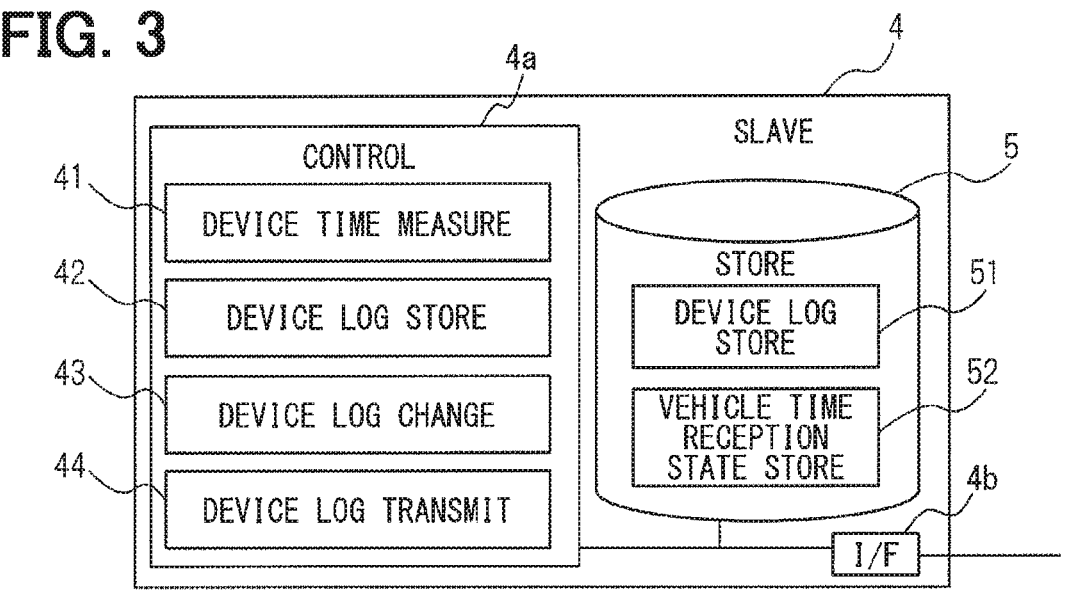
FIG. 3 is a functional block diagram showing a configuration of a slave electronic control device.

As shown in FIG. 3, the slave electronic control device 4 includes a control circuit 4a (or controller 4a) having the sections, a slave device storage 5, and an interface 4b. The sections for providing functions include a device time measurement section 41, a device log information storage section 42, a device time change section 43, and a device log information transmission section 44. The slave device storage 5 includes a device log information storage 51 and a vehicle time reception state storage 52. Note that a storage may be also referred to as a storage unit, as already described above.

The device time measurement section 41 is configured to measure the time using the function of a clock of the slave electronic control device 4. The device log information storage section 42 is configured to store the contents of the event detected by the slave electronic control device 4 together with the device time, as device log information. The device time change section 43 is configured to change the device time based on the vehicle time in response to receiving the vehicle time, and to change the vehicle time reception flag, which is information on vehicle time reception state of the vehicle time reception state storage 52, into received state. The device log information further includes information on device log transmission state indicating whether or not the device log information has been already transmitted to the master electronic control device 2 (i.e., in transmitted state or in not-transmitted state). The device log information transmission section 44 is configured to transmit the device log information and to change the device log transmission state corresponding to the event of the transmitted device log information to be in transmitted state in response to completely transmitting the device log information.

In addition, the device log information storage 51 stores the device log information including (i) the information on detected event, (ii) the device time when the event is detected, and (iii) the vehicle time reception state when the event is detected. The vehicle time reception state storage 52 stores a vehicle time reception flag that is information on vehicle time reception state indicating whether or not the vehicle time is received (i.e., in received state or in not-received state).

With the above configuration of the slave electronic control device 4, the master electronic control device 2 and the slave electronic control device 4 are enabled to record the log information of the event occurring in the vehicle based on the common time information. Here, the event management device 8 may receive the vehicle log information stored in the vehicle log information storage 31 of each of a plurality of master electronic control devices 2. The event management device 8 can integrate and analyze a plurality of vehicle log information(s) of a plurality of vehicles. It is possible to comprehensively analyze the vehicle log information(s) of a plurality of vehicles using a common time. As a result, it is also possible to analyze events deriving from cooperation of a plurality of vehicles such as connected vehicles as a plurality of vehicle log information(s) in which the state of linkage is recorded. Note that the global time may be transmitted from the event management device 8. Here, "integrate and analysis" includes integrally analyzing each vehicle log information while identifying the vehicle that has transmitted the vehicle log information.

Figure 4:
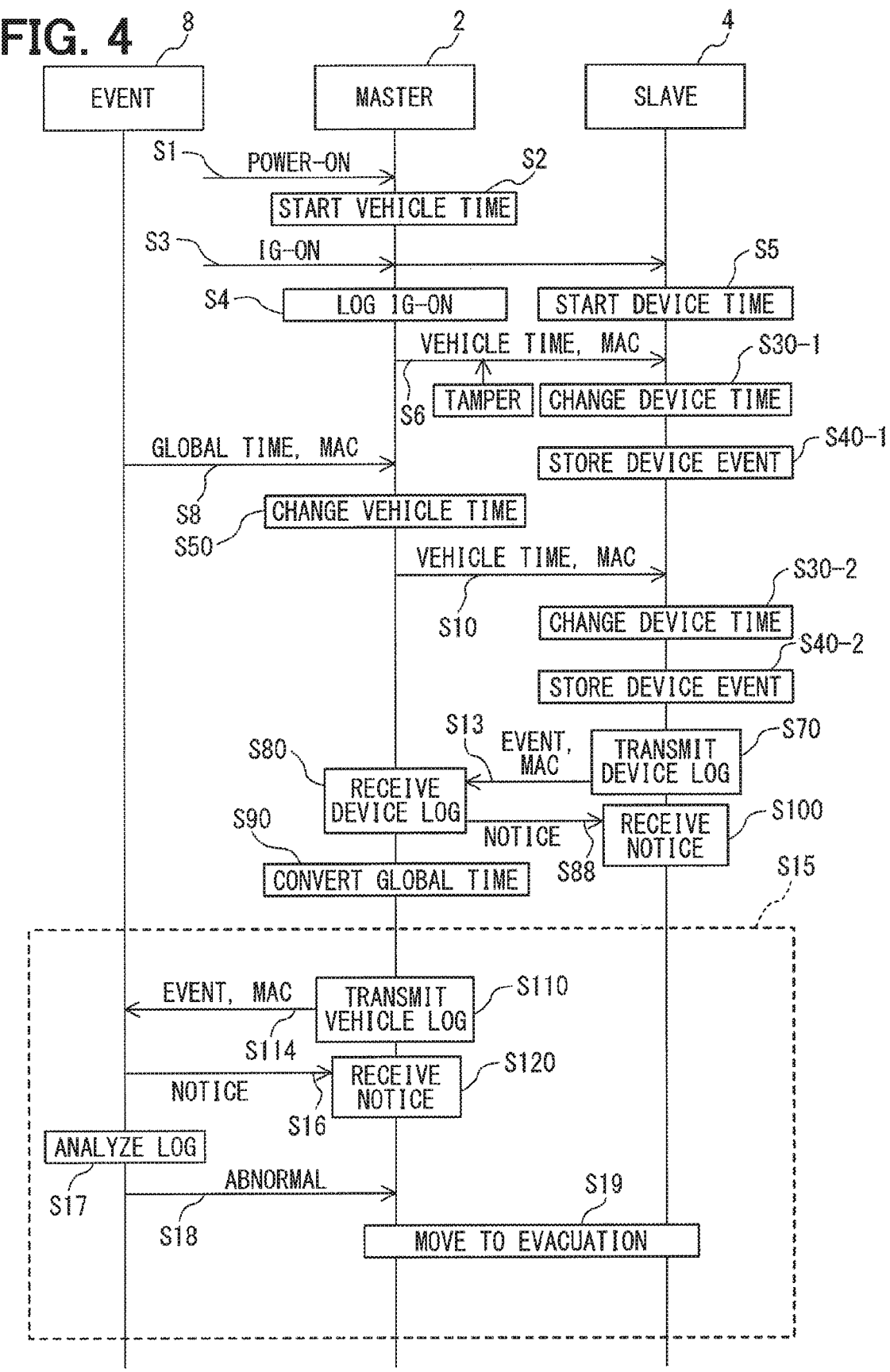
FIG. 4 is a sequence diagram showing an example of processing of a log collection system.

FIG. 4 shows a sequence diagram of processes of the log collection system 1. First, in S1, the power supply to the master electronic control device 2 is turned on. In next S2, the vehicle time measurement section 21 starts measuring the vehicle time. In next S3, the ignition is turned on; the master electronic control device 2 is notified of the turning on of the ignition and the power supply to the slave electronic control device 4 is turned on. As a result, in S5, the device time measurement section 41 of the slave electronic control device 4 starts measuring the device time; in S4, the vehicle log information storage section 23 of the master electronic control device 2 stores the ignition ON event as the vehicle log information in the vehicle log information storage 31. The process of storing the vehicle log information by the vehicle log information storage section 23 is the same as the device event storage process S40 in the slave electronic control device 4 to be described later, so its explanation is omitted.

Figures 5, 6:
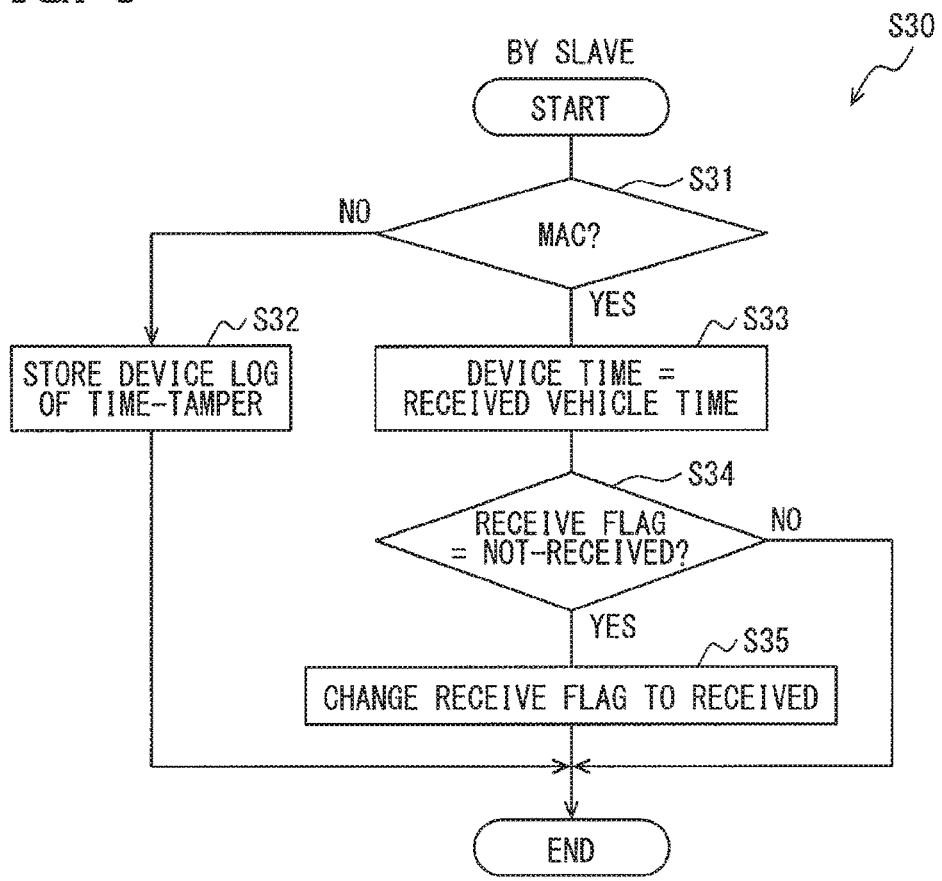
FIG. 5 is a diagram showing contents in a vehicle log information storage in which an ignition ON event is stored.
FIG. 6 is a flowchart showing a device time change process of a device time change section when a vehicle time is received.

As shown in FIG. 5, the vehicle log information storage 31, which the ignition ON event is stored in, contains items of the contents of the event, the global time, the vehicle time, the global time conversion state, and the vehicle log transmission state. Here, the items of the contents of the event may further include additional items of (i) the device where the event has occurred, (ii) the content generated, and (iii) other necessary data. The global time is a time managed by the event management device 8 or the like, for example. When the global time is not received from the event management device 8, the item of the global time may contain a fail-safe value (0xFFFFFFFF in hexadecimal in this embodiment) or the like. The item of the vehicle time contains the vehicle time at the time point of occurrence of the event. The item of the global time conversion state is an item indicating whether or not the stored vehicle time has been converted into the global time managed outside the vehicle (i.e., converted state or not-converted state). The item of the vehicle log transmission state is an item indicating whether or not the stored vehicle log information has been transmitted to the event management device 8 (i.e., transmitted state or not-transmitted state).

As shown in the record of this event, the vehicle log information storage section 23 is configured (i) to detect a signal of ignition ON (IG-ON) which indicates a power ON event to turn on the power of the slave electronic control device 4, and (ii) to store the power ON event in addition to the vehicle time (for example, 0x00001001) at the time point of occurrence of the power ON event, as vehicle log information. In this case, since the vehicle log information relating to the event has not been converted into the global time, nor transmitted to the event management device 8, the item of the global time conversion state is in not-converted state and the item of the vehicle log transmission state is in not-transmitted state.

Here, "the event that turns on the power supply of the slave electronic control device" is the time point at which the slave electronic control device 4 is actually powered on and starts its operation, for example; it may be the time point of turning on the ACC power supply or turning on the ignition.

Returning to FIG. 4, in S6, the vehicle time transmission section 22 of the master electronic control device 2 transmits the vehicle time to the slave electronic control device 4. At this time, the vehicle time transmission section 22 can transmit by attaching a message authentication code (MAC) for authenticating the transmission source and the like. Also, the vehicle time transmission section 22 can transmit the vehicle time on a time-periodic basis. By transmitting the vehicle time periodically, it is possible to suppress an error of the device time of the slave electronic control device 4 to be within a predetermined range from the vehicle time.

When the slave electronic control device 4 receives the vehicle time, the device time change section 43 of the slave electronic control device 4 performs the device time change process S30 (S30-1 in FIG. 4). As shown in FIG. 6, in the device time change process S30, first in S31, the device time change section 43 of the slave electronic control device 4 authenticates the message authentication code received together with the vehicle time. If the authentication cannot be performed successfully (S31: No), in S32, the device log information storage section 42 stores in the device log information storage 51 the fact that authentication is impossible, e.g., a time tampering event. If the authentication can be performed successfully (S31: Yes), in S33, the device time is changed or updated by substituting the received vehicle time into the device time. Subsequently, in S34, it is determined whether or not the vehicle time reception flag is in not-received state, and if it is not in not-received state (S34: No), the process is ended. If it is in not-received state (S34: Yes), the vehicle time reception flag is changed to be in received state in S35, and the process is ended. In the sequence diagram of FIG. 4, it is assumed that the message authentication code cannot be authenticated in this S31, and the time tampering event is stored as the device log information without changing the device time. The device log information storage section 42 performs the device event storage process S40 (S40-1 in FIG. 4) for storing the event as the device log information.

Figures 7, 8:
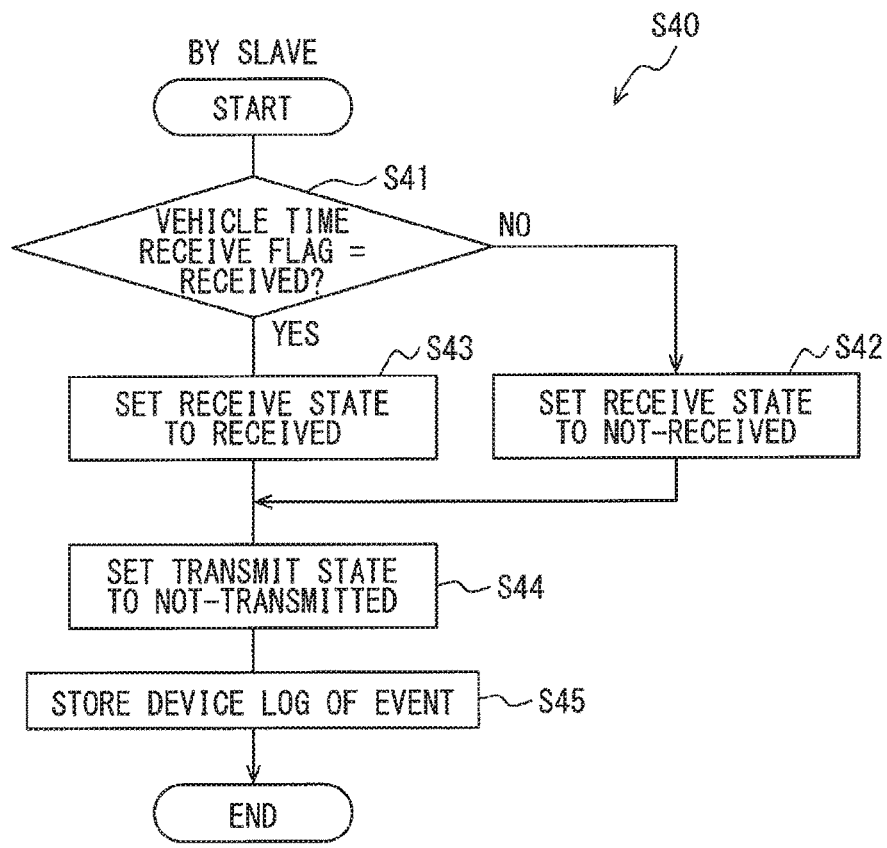
FIG. 7 is a flowchart showing an example of a device event storage process by a device log information storage section to store an event generated in a slave electronic control device in a device log information storage.
FIG. 8 is a diagram showing contents in a device log information storage in which an event of time tampering is stored.

As shown in the device event storage process S40 of FIG. 7, the device log information storage section 42 first checks the vehicle time reception flag in S41 and determines whether or not the vehicle time reception flag is in received state. When the vehicle time reception flag is not in received state (S41: No), the vehicle time reception state of the device log information is set to be in not-received state in S42, and the process proceeds to S44. When the vehicle time reception flag is in received state (S41: Yes), the vehicle time reception state of the device log information is set to be in received state in S43, and the process proceeds to S44. In S44, the device log transmission state of the device log information is set to be in not-transmitted state; in S45, the device log information of the event occurrence is stored together with the device time.

When the device log information storage section 42 stores the time tampering event in the device event storage process S40, the device log information storage 51 contains the contents as shown in FIG. 8. As shown in FIG. 8, the device log information storage 51 includes items of the contents of an event, device time, vehicle time reception state, and device log transmission state. Here, the contents of the event further includes items such as the device where the event has occurred, the content generated, and other necessary data. In the device event storage process 540 at this stage, since the vehicle time reception flag is not in not-received state, the device log information is stored with the vehicle time reception state of the corresponding event in the device log information storage 51 to be in not-received state.

Returning to FIG. 4, in S8, the event management device 8 transmits the global time. The global time may be a time when the radio waves transmitted from the so-called positioning satellites are received and matched, or may be a time that is simply managed by a server device. In the present embodiment, the event management device 8 is configured to transmit the global time, but the device that transmits the global time may not be the event management device 8. Here, even in the transmission of the global time, the message authentication code can be attached and transmitted. Upon receipt of the global time, the vehicle time change section 25 of the master electronic control device 2 performs a vehicle time change process S50.

Figure 9:
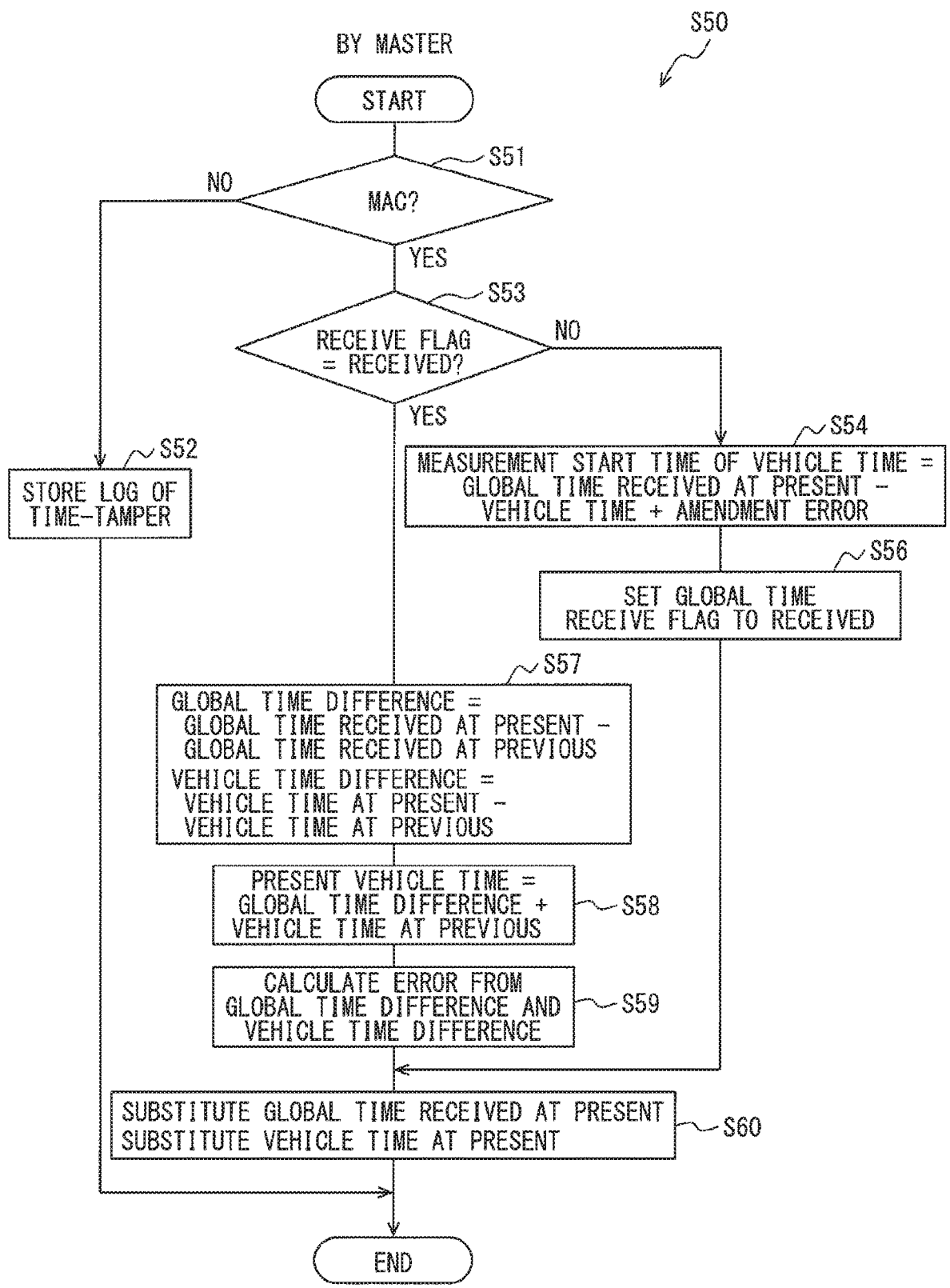
FIG. 9 is a flowchart showing a vehicle time change process by a vehicle time change section when a global time is received.

As shown in the vehicle time change process S50 in FIG. 9 by the vehicle time change section 25, in response to receiving a global time at the present reception, the vehicle time change section 25 first authenticates, in S51, the message authentication code received together with the global time at the present reception. When the authentication cannot be performed successfully (S51: No), in S52, the vehicle log information storage section 23 determines that it is, for example, a time tampering event and stores it in the vehicle log information storage 31. Then the process is ended. When the authentication can be performed successfully (S51: Yes), it is determined in S53 whether or not the global time reception flag is in received state. When the global time reception flag is not in received state (S53: No), the measurement start time of the vehicle time is set in S54 to be the time obtained by adding the amendment error onto the time obtained by subtracting the vehicle time from the received global time (MEASUREMENT START TIME OF VEHICLE TIME=GLOBAL TIME RECEIVED AT PRESENT−VEHICLE TIME+AMENDMENT ERROR). Here, the vehicle time is calculated assuming that the vehicle time is reset (for example, 0) when the power supply to the slave electronic control section 4 is turned on. When the vehicle time has a value at the time of turning on the power supply, the calculation can be made in consideration of the value. Subsequently, in S56, the global time reception flag is set to be in received state; the process proceeds to S60.

When the global time reception flag is in received state (S53: Yes), in S57, a global time difference is obtained by subtracting the global time received at the previous reception from the global time received at the present reception (GLOBAL TIME DIFFERENCE=GLOBAL TIME RECEIVED AT PRESENT−GLOBAL TIME RECEIVED AT PREVIOUS). Further, a vehicle time difference is obtained by subtracting the vehicle time at the time point of receiving the global time at the previous reception from the vehicle time at the time point of receiving the global time at the present reception (VEHICLE TIME DIFFERENCE=VEHICLE TIME AT PRESENT−VEHICLE TIME AT PREVIOUS).

Next, in S58, a present vehicle time is set by adding the global time difference onto the vehicle time at the time point of receiving the global time at the previous reception (PRESENT VEHICLE TIME=GLOBAL TIME DIFFERENCE+VEHICLE TIME AT PREVIOUS). That is, suppose a case that the first global time is received at the first reception (i.e., the previous reception) among two consecutive receptions and the second global time is received at the second reception (i.e., the present reception) of the consecutive receptions. In such a case, the present global time is obtained by adding the global time difference which is a difference between the first global time and the second global time onto the vehicle time at the time point of receiving the first global time at the first reception.

Further, in S59, when receiving the global time, the error calculation section 26 calculates an amendment error based on (i) the vehicle time difference between the vehicle time at the time point of receiving the second global time at the second reception and the vehicle time at the time point of receiving the first global time at the first reception and (ii) the global time difference between the between the first global time and the second global time. The amendment error is used in, for example, above-described S54. Calculating the amendment error in this way makes it possible to more accurately convert the occurrence time of the event occurring during a period of time from when the master electronic control section 2 is powered on to when the master electronic control device first receives the global time. Subsequently, in S60, the received second global time is substituted into the variable indicating the first global time at the first reception; the vehicle time at the time point of receiving the second global time at the second reception is substituted into the vehicle time at the time point of receiving the first global time at the first reception. Then, the process is ended.

Returning to FIG. 4, in S10, the vehicle time transmission section 22 transmits the vehicle time together with the message authentication code to the slave electronic control device 4. Upon receiving the vehicle time, the device time change section 43 of the slave electronic control section 4 executes the device time change process S30 (S30-2 in FIG. 4). Since the device time change process S30 is the same as the description using FIG. 6 described above, redundant explanation will be omitted. Note that, in the device time change process S30 here, it is assumed that the vehicle time is not tampered with; thus, in S33, the device time is changed to the corresponding vehicle time and the vehicle time reception flag is changed to be in received state.

Subsequently, when an event occurs in the slave electronic device 4, a device event storage process S40 (S40-2 in FIG. 4) is executed. This device event storage process S40 in the slave electronic control device 4 is the same as described in FIG. 7, duplicate explanation will be omitted.

Figures 10, 11:
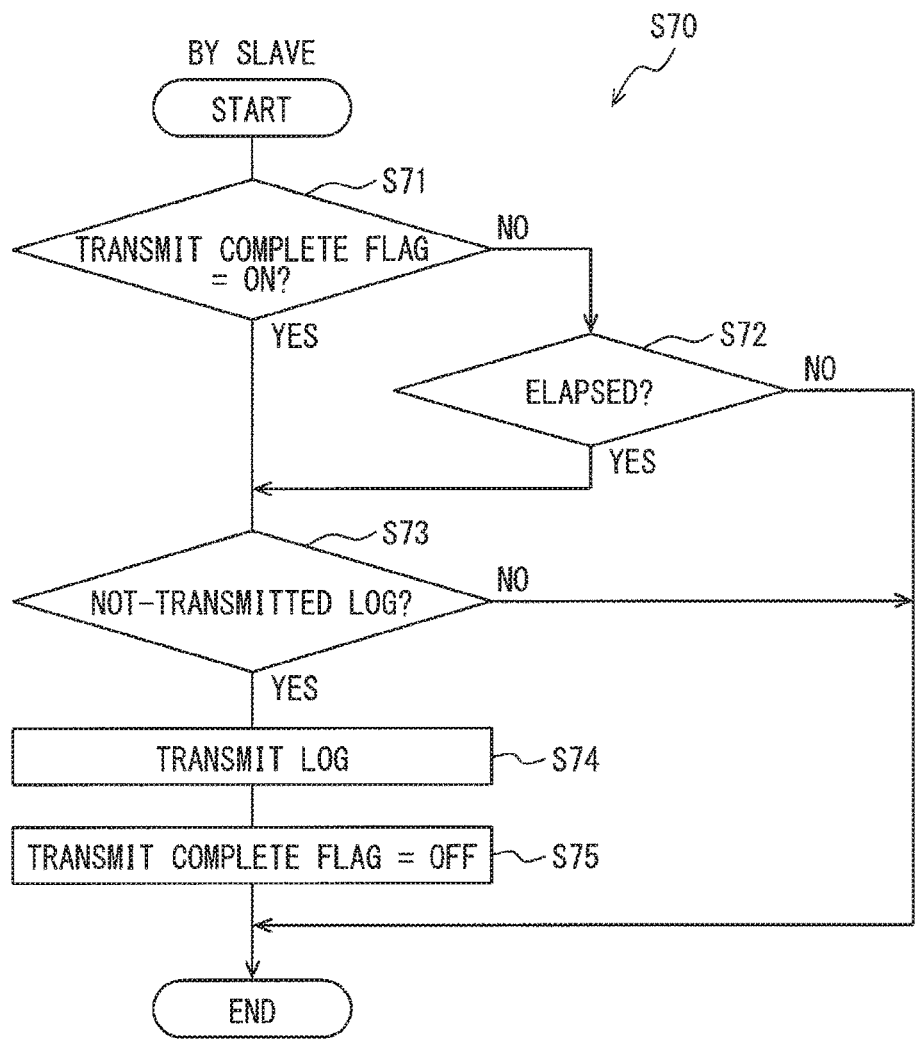
FIG. 10 is a diagram showing contents in a device log information storage which stores an event having occurred when a vehicle time reception state is in received state.
FIG. 11 is a flowchart showing a device log transmission process by a device log information transmission section of a slave electronic control device.

As shown in the contents of the device log information storage 51 in FIG. 10, a newly added event is stored when the vehicle time reception flag stored in the vehicle time reception state storage 52 is in received state; thus, the column of the vehicle time reception of the event in the device log information storage 51 is already stored as being in received state. Subsequently, the slave electronic control device 4 executes the device log transmission process S70 of FIG. 11. In the device log transmission process 570, the device log information transmission section 44 first determines in S71 whether or not the transmission completion flag indicating that the transmission of the device log information has been completed is in ON state. When the transmission completion flag is not in an ON state (S71: No), in S72, it is determined whether or not a predetermined period of time has elapsed since the transmission of the device log information. When the predetermined period of time has not elapsed (S72: No), the device log transmission process S70 is ended.

On the other hand, when the predetermined period of time has elapsed (S72: Yes), or when the transmission completion flag is in ON state in S71, the process proceeds to S73. In S73, it is determined whether the item of the device log transmission state of the device log information storage 51 is in not-transmitted state. When there is no not-transmitted device log information, the device log transmission process S70 is ended. When there is not-transmitted device log information, the not-transmitted device log information is transmitted to the master electronic control device 2 in S74. At this time, the device log information may be transmitted to the master electronic control device 2 together with a message authentication code.

Figures 12, 13:
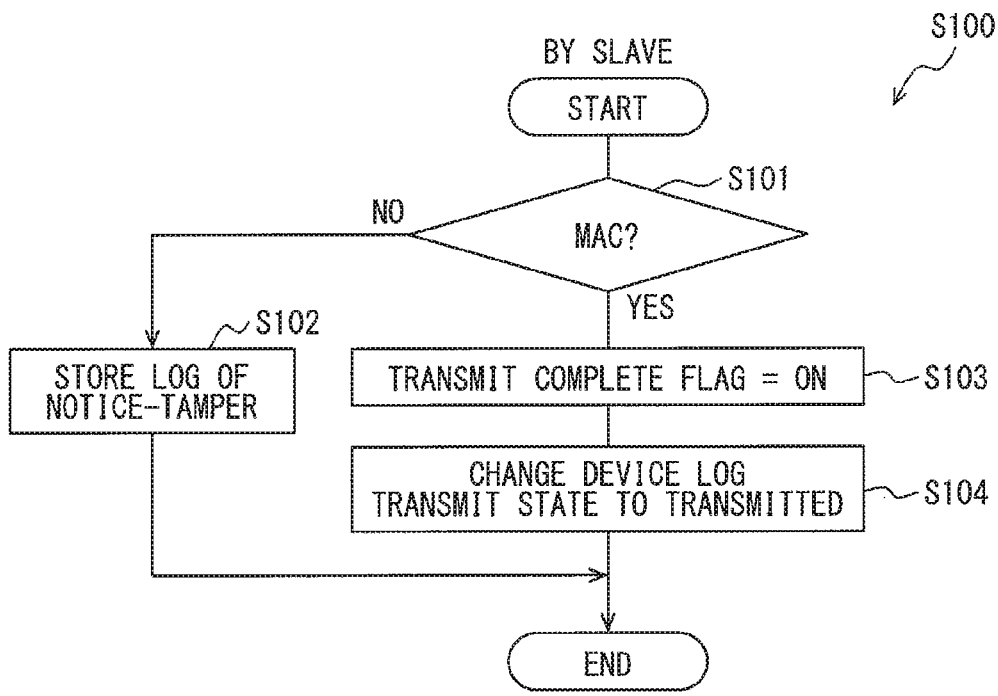
FIG. 12 is a flowchart showing a reception process of a device log reception completion notice by a device log information transmission section of a slave electronic control device.
FIG. 13 is a diagram showing the contents in a device log information storage in which a column of a device log transmission state of a transmitted event is changed to be in transmitted state.

Subsequently, in S75, the transmission completion flag is changed to OFF state, and the device log transmission process S70 is ended. Subsequently, upon receiving, from the master electronic control device 2, the device log reception completion notice (S88 of FIG. 4) indicating that the device log information has been received, the device log information transmission section 44 executes the device log reception completion notice reception process S100 in FIG. 12. In the device log reception completion notice reception process S100, first, in S101, it is determined whether or not the received message authentication code of the device log reception completion notice is correct. Here, when the message authentication code is incorrect (S101: No), for example, it is determined that the device log reception completion notice has been tampered with. Such a message is thus stored in S102 in the device log information storage 51 as device log information; then, the device log reception completion notice reception process S100 is ended. When the message authentication code is correct (S101: Yes), the transmission completion flag is changed to the ON state in S103, and the column of the device log transmission state of the device log information relating to transmission is changed to "transmitted state" in S104. The process is then ended. FIG. 13 shows the contents of the device log information storage 51 in which the column of the device log transmission state of the transmitted event is changed to transmitted state.

Figure 14:
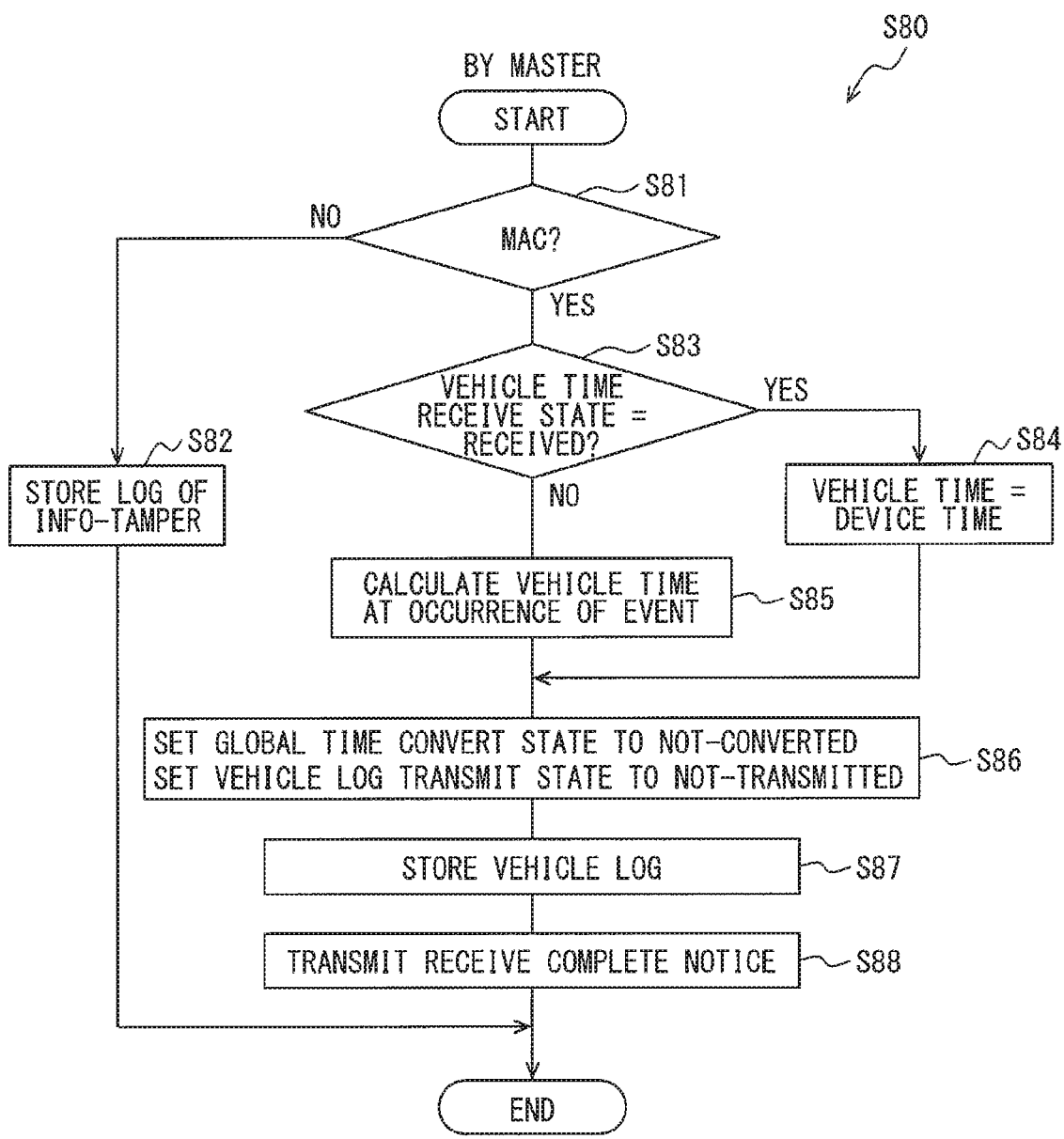
FIG. 14 is a flowchart showing a device log information reception process by a device log information reception section of a master electronic control device.

In the master electronic control device 2 that receives the device log information, as shown in FIG. 14, the device log reception process S80 is performed by the device log information reception section 28. In the device log reception process S80, first in S81, it is determined whether the message authentication code of the received device log information is correct or not. When the message authentication code is incorrect (S81: No), it is determined that the device log information is tampered with, for example, such a tampering event is stored as the vehicle log information in the vehicle log information storage 31. Since this storage process is the same as the device event storage process S40 of the slave electronic control device 4, its description will be omitted.

When the message authentication code is correct (S81: Yes), in S83, it is determined whether or not the column of the vehicle time reception state in each event of the received device log information is in received state. When the column of the vehicle time reception state is in received state (S83: Yes), the device time of the event is set to the vehicle time in S84. The process then proceeds to S86. On the other hand, when the column of the vehicle time reception state is not in received state (S83: No), the vehicle time at the time point of occurrence of the event is calculated and set in S85. Specifically, for example, the slave electronic control device 4 can calculate the vehicle time at the time point of occurrence of an event, by adding the vehicle time when the ignition is turned on to power on the slave electronic control device 4 onto the device time at the time point of occurrence of the event. As described above, the conversion to the vehicle time by the device log information reception section 28 can be performed based on the vehicle time at the time point of occurrence of the power ON event.

By converting to the vehicle time on the basis of the vehicle time at the time point of occurrence of the power ON event in this way, the master electronic control device 2 can convert the device time into the vehicle time even if an event occurs before the slave electronic control section 4 receives the vehicle time. Therefore, the master electronic control device 2 and the slave electronic control device 4 can record the log information of the event occurring in the vehicle based on the common time information.

Figures 15, 16:
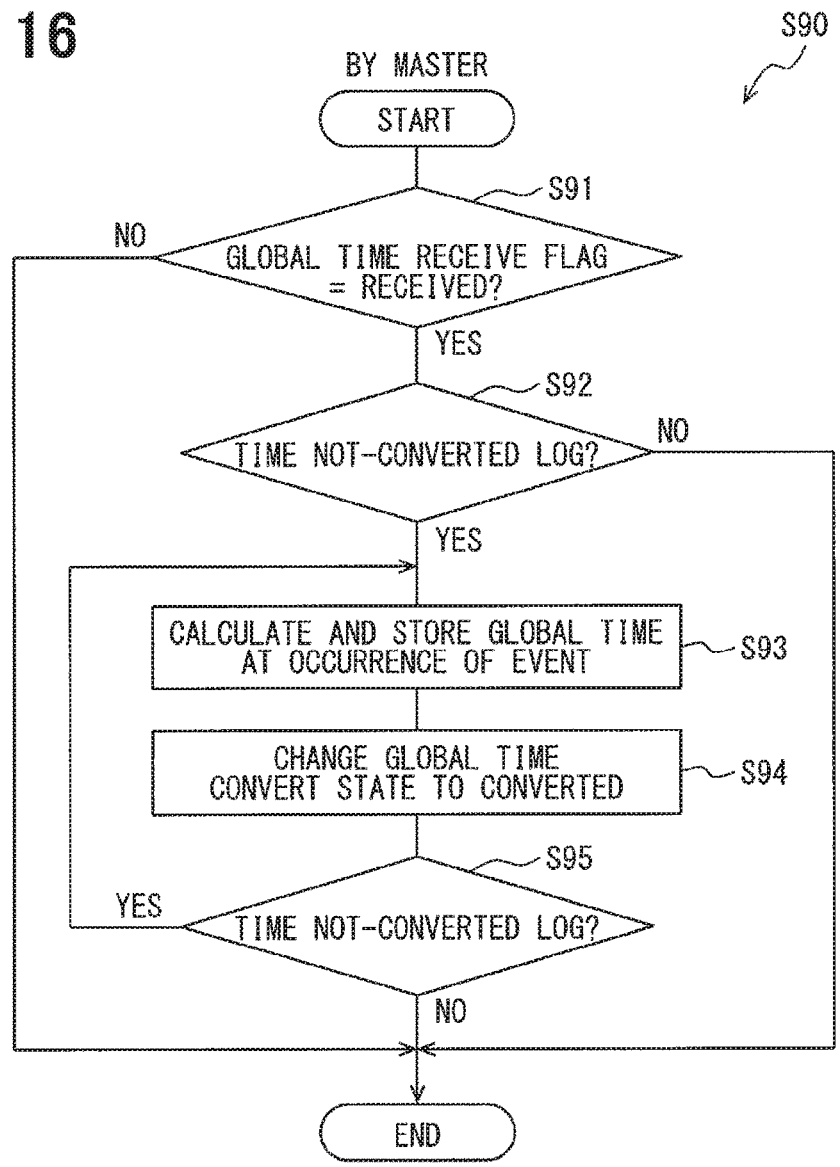
FIG. 15 is a diagram showing contents in a vehicle log information storage in which received device log information is stored as vehicle log information.
FIG. 16 is a flowchart showing a global time conversion process by a global time conversion section of a master electronic control device.

Next, in S86, the item of he global time conversion is set to be in not-converted state, while the item of the vehicle log transmission state is set to be in not-transmitted state. In S87, together with the vehicle time set in S84 or S85, the received device log information is stored as vehicle log information. Subsequently, in S88, a notice of completion of reception of the device log information is transmitted to the slave electronic control device 4. FIG. 15 shows the contents of the vehicle log information storage 31 in which the received device log information is stored as vehicle log information. Returning to FIG. 4, the global time conversion section 24 of the master electronic control device 2 subsequently executes the global time conversion process S90. Note that the global time conversion process S90 is, for example, a process as shown in the flowchart of FIG. 16 and may be executed periodically.

In the global time conversion process S90, first in S91, it is determined whether or not the global time reception flag indicating whether or not the global time is received is in ON state. When the global time is not received (S91: No), the global time conversion process S90 is ended. When the global time is received (S91: Yes), it is determined in S92 whether there is a time not-converted log in which the column of the global time conversion is in not-converted state. When there is no time not-converted log (S92: No), the global time conversion process S90 is ended. When there is a time not-converted log (S92: Yes), the global time at the time point of occurrence of the event related to the time not-converted log is calculated and stored in the vehicle log information storage 31. Specifically, for example, the vehicle time at the time point of occurrence of the event is added to the global time at the start of the vehicle time measurement obtained in the vehicle time change process S50 in FIG. 9, and the vehicle time is stored as the global time.

Figure 17:
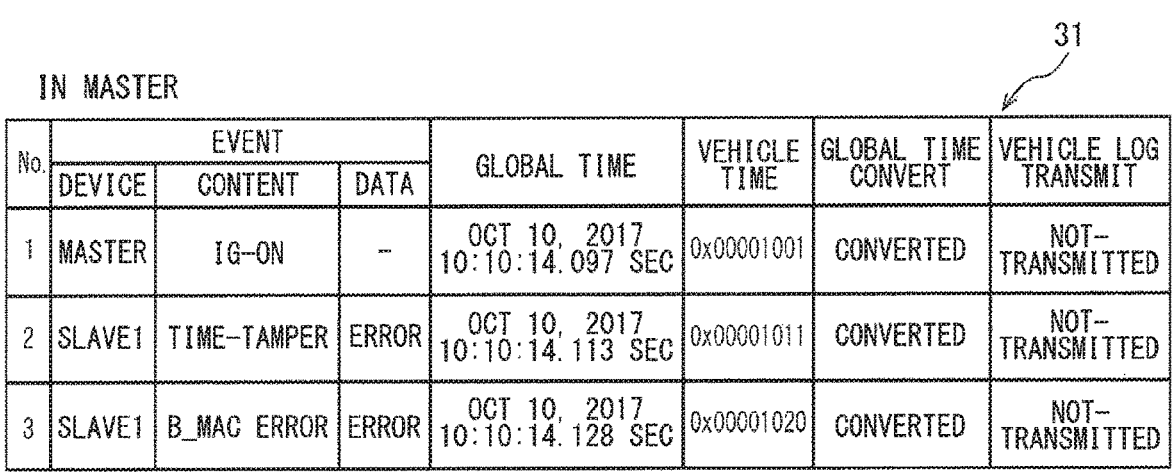
FIG. 17 is a diagram showing the contents of vehicle log information in a vehicle log information storage in which a global time conversion is in converted state.

Subsequently, in S94, the column of the global time conversion of the corresponding event is changed to be in converted state and stored; in S95, it is determined whether there is any other time not-converted log. If there is another time not-converted log (S95: Yes), the process returns to S93 to repeat the process. If there is no time not-converted log (S95: No), the global time conversion process S90 is ended. FIG. 17 shows the contents of the vehicle log information of the vehicle log information storage 31 in which the global time conversion is in converted state.

Figure 19:
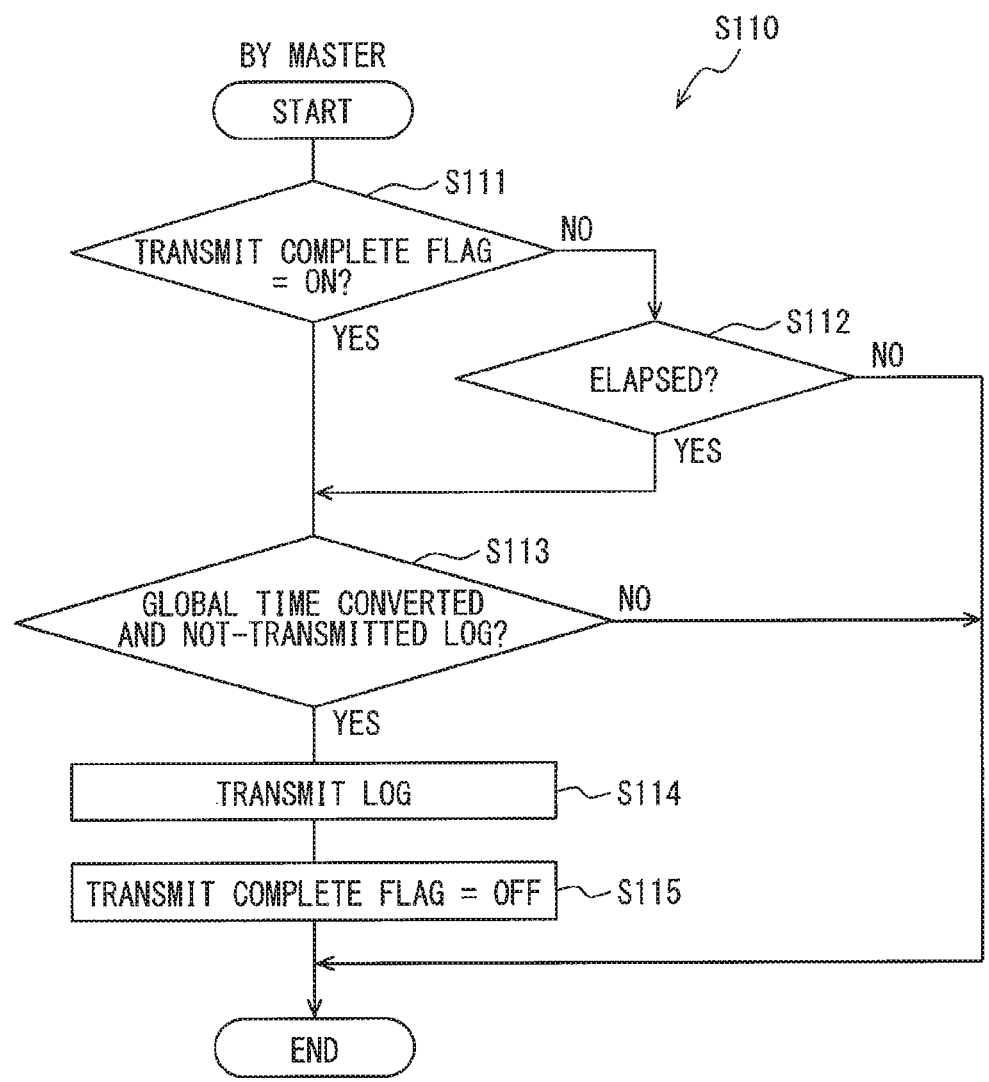
FIG. 19 is a flowchart showing a vehicle log transmission process by a vehicle log information transmission section of a master electronic control device.

Returning to FIG. 4, the master electronic control device 2 executes a process S15 for the event management device 8. In S15 for the event management device 8, in S110, the vehicle log information transmission section 27 of the master electronic control device 2 executes the vehicle log transmission process S110. As shown in FIG. 19, in the vehicle log transmission process S110, first, the vehicle log information transmission section 27 determines whether the transmission completion flag indicating that the transmission of the vehicle log information is completed is in ON state in S111. When the transmission completion flag is not in ON state (S111: No), it is determined in S112 whether or not a predetermined period of time has elapsed since the transmission of the vehicle log information. When the predetermined period of time has not elapsed (S112: No), the vehicle log transmission process S110 is ended.

On the other hand, when the predetermined period of time has elapsed (S112: Yes), or when the transmission completion flag is in ON state in S111, the process proceeds to S113. In S113, it is determined whether or not, in the vehicle log information storage 31, (i) the global time conversion state is in converted state and (ii) the vehicle log transmission state is in not-transmitted state. When the determination in S113 is negated (S113: NO), the vehicle log transmission process S110 is ended. When the determination in S113 is affirmed (S113: Yes), in S114, the not-transmitted vehicle log information is transmitted to the event management device 8. At this time, the vehicle log information may be transmitted to the event management device 8 together with the message authentication code. Subsequently, in S115, the transmission completion flag is changed to be in OFF state, and the vehicle log transmission process S110 is ended.

Figure 18:
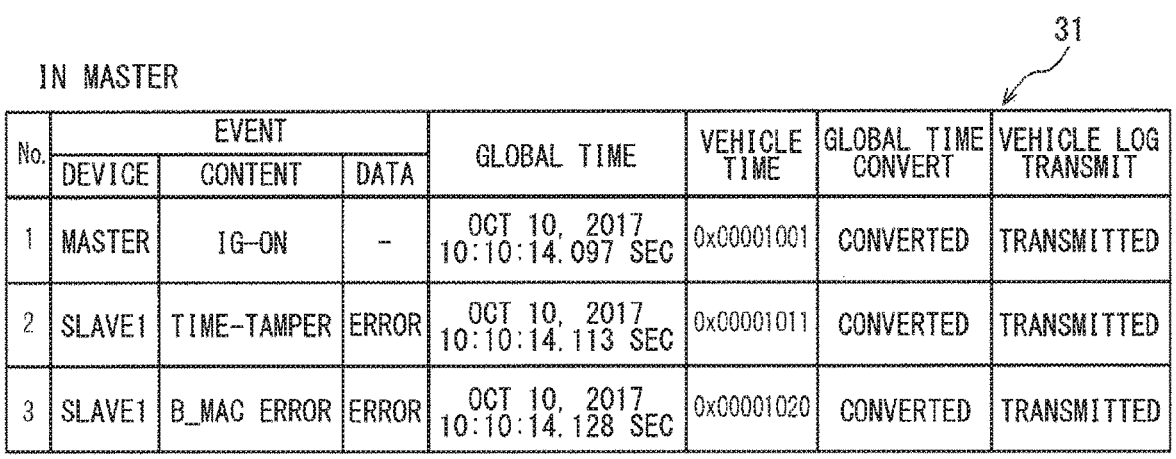
FIG. 18 is a diagram showing contents of vehicle log information in a vehicle log information storage in which a vehicle log transmission state is in transmitted state.
Figure 20:
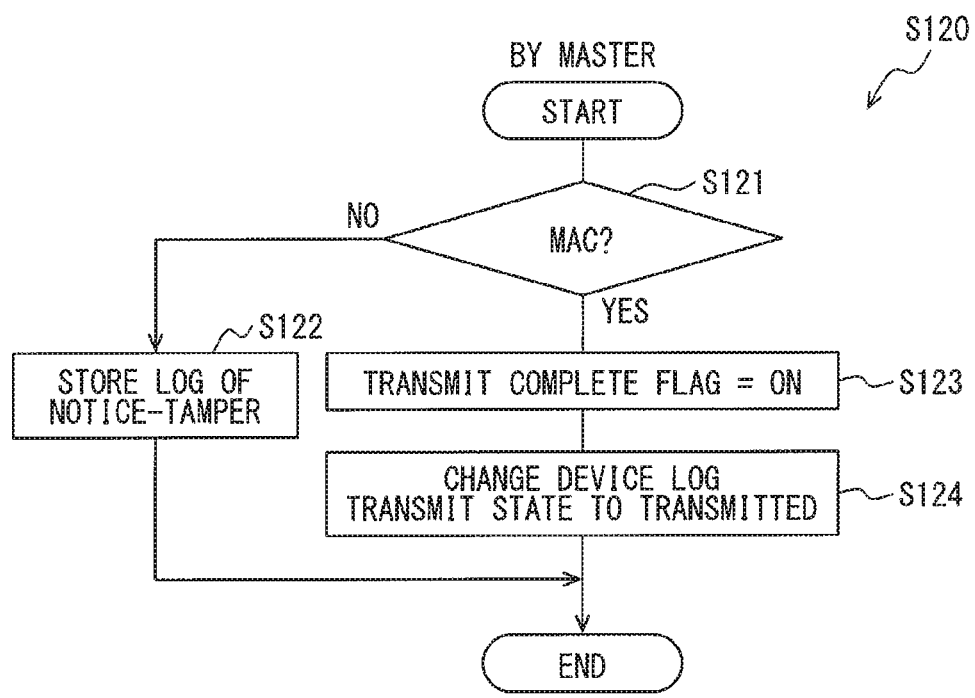
FIG. 20 is a flowchart showing a reception process of a vehicle log reception completion notice by a vehicle information transmission section of a master electronic control device.

Subsequently, upon receiving, from the event management device 8, the vehicle log reception completion notice (S16 in FIG. 4) indicating that the vehicle log information is received, the vehicle log information transmission section 27 executes the vehicle log reception completion notice reception process S120 in FIG. 20. In the vehicle log reception completion notice reception process S120, first, in S121, it is determined whether or not the message authentication code of the received vehicle log reception completion notice is correct. When the message authentication code is incorrect (S121: No), it is determined that, for example, the vehicle log reception completion notice is tampered with. In S122, such a tampered state is stored as vehicle log information in the vehicle log information storage 31; the vehicle log reception completion notice reception process S120 is ended. When the message authentication code is correct (S121: Yes), the transmission completion flag is changed to be in ON state in S123. In S124, the column of the vehicle log transmission state of the vehicle log information relating to transmission is set to be in transmitted state; then, the present process is ended. FIG. 18 shows the contents of the vehicle log information in the vehicle log information storage 31, where the vehicle log transmission states are each in transmitted state.

Subsequently, the event management device 8 analyzes the vehicle log information in S17. In this analysis, the vehicle log information collected from each vehicle may be integrated and analyzed. When an abnormality is detected in the analysis process, in S18, an abnormality is reported to the vehicle in which the abnormality is detected. The vehicle to which the abnormality is reported is enabled to shift to the evacuation traveling mode in S19, for example, to not perform automatic driving.

The above describes the master electronic control device, the slave electronic control device, the log collection system, and the storage medium storing the log collection program according to the embodiment of the present disclosure.

The master electronic control device or the slave electronic control device of the present disclosure corresponds to all various in-vehicle electronic control units (ECUs). Examples of the form of the electronic control unit of the present disclosure include a semiconductor, an electronic circuit, a module, and a microcomputer. Further, necessary functions such as an antenna and a communication interface may be added thereto. Also, it is possible to adopt a form such as a car navigation system, a smartphone, a personal computer, or a portable information terminal.

In addition, the present disclosure can be applied not only to those which can be realized by the dedicated hardware (e.g., "master electronic control device" or "slave electronic control device" as ECU) described above, but also to a storage medium such as a memory or a hard disk, a program, and special-purposed or general-purposed hardware capable of executing the program. This makes it possible to constantly provide the latest functions through program upgrades. That is, the present disclosure also includes a log collection program capable of executing a log collection method in a master electronic control device or a slave electronic control device by a computer.

The master electronic control device for a vehicle, the slave electronic control device for a vehicle, the vehicle log collection system for a vehicle, and the log collection program for a vehicle according to the present disclosure have been described with the ECU mounted in a vehicle or an automobile in the embodiment, but a motorcycle, a ship, a train, an aircraft, and the like, in general, a moving mobile object. Also, it is applicable not only to a mobile object but also to products including microcomputers in general.

For reference to further explain features of the present disclosure, a comparative technique is described as follows. A system called STEM (Security Information and Event Management) that detects attacks from crackers or the like by collecting and analyzing operation logs of servers and/or networks that are included in an information system. It is also known to incorporate SIEM as a countermeasure against cyber security in vehicles as well. Further, there has been developed in vehicles a system in which vehicles communicate and cooperate with each other as called connected vehicles.

In the case that a plurality of vehicles operate in cooperation like connected vehicles, it is desirable to analyze, for example, collectively all the vehicle operation log information outputted from a plurality of vehicles. In addition, not only to handle cybersecurity, it is efficient to analyze a plurality of log information outputted from a plurality of vehicles together in order to identify the reason such as the failure of cooperative operation of the vehicles in the connected vehicles.

A failure diagnosis system for a vehicle is known which includes: a time information generating means for generating time information in a different manner according to a mode of information processing and providing the generated time information to the in-vehicle device; a recording means for recording the diagnosis code and the time information acquired from the time information generating means when a failure is detected; a mode information recording means for recording mode determination information for determining the mode of the time information generating means; and a providing means for providing the mode determination information and the time information for estimating the mode when the failure is detected.

In the analysis of the log information relative to a plurality of vehicles as described above, it is necessary to make log information based on accurate time information in each vehicle so that the analyzed occurrence order of the events occurring in the respective vehicles does not differ from the actual order. However, in each vehicle, a plurality of electronic control devices (which may also referred to as ECUs (Electronic Control Units)) each having an individual clock are operating, while events are generated and recorded in each electronic control device. In addition, among these electronic control devices, some may have different timings of the power supply ON/OFF whereas some may shift to a low power consumption mode. For this reason, it is sometimes difficult to match the time information between the electronic control devices; thus, it is difficult to acquire a log based on common time information from each electronic control device.

It is thus desirable to provide a technology which can record log information of each of a plurality of events occurring in a vehicle based on common time information.

Aspects of the disclosure described herein are set forth in the following clauses.

According to a first aspect of the present disclosure, a master electronic control device for a vehicle may be provided to include a vehicle time transmission section, a device log information reception section, and a vehicle log information storage. The vehicle time transmission section may be configured to transmit a vehicle time to a slave electronic control device, the vehicle time being managed by the master electronic control device to be used in common with the slave electronic control device. The device log information reception section may be configured to receive device log information from the slave electronic control device, the device log information including (i) a content of an event in the slave electronic control device, (ii) a device time specific to the slave electronic control device when the event is detected, and (iii) information on vehicle time reception state that indicates whether, when the event is detected, the slave electronic control device has already received the vehicle time from the master electronic control device, and to perform a conversion of the device time included in the device log information into the vehicle time that corresponds to the device time in response to that the information on vehicle time reception state is in a not-received state that indicates that, when the event is detected, the slave electronic control device has not received the vehicle time. The vehicle log information storage, which may be connected with the control circuit, may store vehicle log information that includes (i) the content of the event in the slave electronic control device and (ii) the vehicle time after the conversion is performed.

With the above-described configuration according to the first aspect, the master electronic control device and the slave electronic control device can record the log information of the event occurring in the vehicle based on the common time information.

In addition, according to a second aspect, a master electronic control device for a vehicle may be provided to include (i) at least one control circuit that functions as the vehicle time transmission section and the device log information reception section according to the first aspect; and (ii) the vehicle log information storage according to the first aspect.

Further, as an optional aspect of the second aspect, in the master electronic control device, an individual control circuit of the at least one control circuit may be configured to include (i) at least one hardware circuit, or (ii) at least one central processing unit along with memory storing instructions, or (iii) a combination of (a) the at least one hardware circuit and (b) the at least one central processing unit along with memory.

Furthermore, as another optional aspect of the second aspect, in the master electronic control device, the at least one control circuit may be configured by using at least one processor, wherein an individual processor of the at least one processor may be configured to include (i) at least one hardware circuit, or (ii) at least one central processing unit along with memory storing instructions, or (iii) a combination of (a) the at least one hardware circuit and (b) the at least one central processing unit along with memory.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A master electronic control device for a vehicle, comprising:
    a control circuit configured
        to transmit a vehicle time to a slave electronic control device, the vehicle time being managed by the master electronic control device to be used in common with the slave electronic control device,
        to receive device log information from the slave electronic control device, the device log information including (i) a content of an event in the slave electronic control device, (ii) a device time specific to the slave electronic control device when the event is detected, and (iii) information on vehicle time reception state that indicates whether, when the event is detected, the slave electronic control device has already received the vehicle time from the master electronic control device, and
        to perform a conversion of the device time included in the device log information into the vehicle time that corresponds to the device time in response to that the information on vehicle time reception state is in a not-received state that indicates that, when the event is detected, the slave electronic control device has not received the vehicle time; and
    a vehicle log information storage connected with the control circuit, the vehicle log information storage storing vehicle log information that includes (i) the content of the event in the slave electronic control device and (ii) the vehicle time after the conversion is performed.

2. The master electronic control device according to claim 1, wherein:
    the vehicle log information storage further stores (i) a power ON event that is an event to turn on a power supply to the slave electronic control device and (ii) the vehicle time at an occurrence of the power ON event, as the vehicle log information; and
    the control circuit is configured to perform the conversion of the device time into the vehicle time corresponding to the device time based on the vehicle time at the occurrence of the power ON event.

3. The master electronic control device according to claim 1, wherein:
    the vehicle log information further includes information on global time conversion state indicating whether the vehicle time stored in the vehicle log information storage is converted into a global time that is managed by an outside source external to the vehicle; and
    in response to receiving the global time, the control circuit is further configured
        to perform a conversion of the vehicle time of the vehicle log information stored in the vehicle log information storage into the global time and
        to change the global time conversion state into information indicating a converted state.

4. The master electronic control device according to claim 3, wherein
    in response to receiving a first global time at a first reception and then receiving a second global time at a second reception following the first reception, the control circuit is further configured to change into an updated vehicle time, the updated vehicle time being calculated by adding a global time difference between the first global time and the second global time onto the vehicle time when the first global time is received at the first reception.

5. The master electronic control device according to claim 4, wherein:
   the control circuit is further configured to calculate an amendment error based on a difference between (i) the global time difference between the first global time and the second global time and (ii) a vehicle time difference between the vehicle time when the second global time is received at the second reception and the vehicle time when the first global time is received at the first reception; and
   in response to receiving a global time newly after a power ON, the control circuit is configured to perform an amendment against the vehicle time based on the amendment error.

6. The master electronic control device according to claim 1, wherein:
   the vehicle log information further includes vehicle log transmission state information indicating whether or not the stored vehicle log information is transmitted to an event management device; and
   the control circuit is further configured to transmit the vehicle log information stored in the vehicle log information storage to the event management device.

7. The master electronic control device according to claim 1, wherein
   when transmitting the vehicle time to the slave electronic control device, the control circuit is configured to transmit the vehicle time to the slave electronic control device periodically.

8. A slave electronic control device for a vehicle, comprising:
   a vehicle time reception state storage storing information on vehicle time reception state indicating whether or not a vehicle time is received from a master electronic control device, the vehicle time being managed by the master electronic control device to be used in common with the slave electronic control device;
   a device log information storage storing device log information that includes (i) a content of an event that is detected, (ii) a device time specific to the slave electronic device when the event is detected, and (iii) information on vehicle time reception state that indicates whether, when the event is detected, the slave electronic control device has already received the vehicle time from the master electronic control device; and
   a control circuit connected with the vehicle time reception state storage and the device log information storage, the control circuit being configured
      to set the vehicle time newly as the device time in response to receiving the vehicle time, and
      to change the information on vehicle time reception state stored in the vehicle time reception state storage into information indicating a received state of the vehicle time.

9. The slave electronic control device according to claim 8, wherein:
   the device log information further includes information on device log transmission state indicating whether or not the device log information is transmitted to the master electronic control device; and
   the control circuit is further configured
      to transmit the device log information, and
      to change, in response to completing transmitting the device log information, the device log transmission state relative to the event of the transmitted device log information into information indicating a transmitted state.

10. The slave electronic control device according to claim 8, wherein:
    the received vehicle time contains a data attached with a message authentication code; and
    the device log information storage is further store, as the device log information, information indicating that an authentication is disabled in response to that the data of the vehicle time fails to be authenticated by the message authentication code.

11. A log collection system for a vehicle, including a master electronic control device and a slave electronic control device connected with the master electronic control device via a communication network, the master electronic control device managing a vehicle time used in common with the slave electronic control device, the slave electronic control device managing a device time specific to the slave electronic control device,
    the master electronic control device comprising:
    a control circuit configured
       to transmit the vehicle time to the slave electronic control device,
       to receive device log information from the slave electronic control device, the device log information including (i) a content of an event in the slave electronic control device, (ii) the device time specific to the slave electronic control device when the event is detected, and (iii) information on vehicle time reception state that indicates whether, when the event is detected, the slave electronic control device has already received the vehicle time from the master electronic control device, and
       to perform a conversion of the device time included in the device log information into the vehicle time that corresponds to the device time in response to that the information on vehicle time reception state is in a not-received state that indicates that, when the event is detected, the slave electronic control device has not received the vehicle time; and
    a vehicle log information storage connected with the control circuit, the vehicle log information storage storing vehicle log information that includes (i) the content of the event in the slave electronic control device and (ii) the vehicle time after the conversion is performed,
    the slave electronic control device comprising:
    a vehicle time reception state storage storing information on vehicle time reception state indicating whether or not the vehicle time is received from the master electronic control device;
    a device log information storage storing the device log information; and
    a control circuit connected with the vehicle time reception state storage and the device log information storage, the control circuit being configured
       to set the vehicle time newly as the updated device time in response to receiving the vehicle time, and
       to change the information on vehicle time reception state stored in the vehicle time reception state storage into information indicating a received state of the vehicle time.

12. The log collection system according to claim 11, further including:

an event management device that receives the vehicle log information stored in the vehicle log information storage of each of a plurality of the master electronic control devices, wherein the event management device integrates and analyzes a plurality of vehicle log information in a plurality of vehicles where the plurality of the master electronic control devices are provided respectively.

13. A non-transitory computer-readable storage medium containing instructions of a log collection program product used for a master electronic control device, the instructions executable by a computer, the instructions for implementing:

transmitting a vehicle time to a slave electronic control device, the vehicle time being managed by the master electronic control device to be used in common with the slave electronic control device;

receiving device log information from the slave electronic control device, the device log information including (i) a content of an event in the slave electronic control device, (ii) a device time specific to the slave electronic control device when the event is detected, and (iii) information on vehicle time reception state that indicates whether, when the event is detected, the slave electronic control device has already received the vehicle time from the master electronic control device;

performing a conversion of the device time included in the device log information into the vehicle time that corresponds to the device time in response to that the information on vehicle time reception state is in a not-received state that indicates that, when the event is detected, the slave electronic control device has not received the vehicle time; and storing vehicle log information that includes (i) the content of the event in the slave electronic control device and (ii) the vehicle time after the conversion is performed.

14. A non-transitory computer-readable storage medium containing instructions of a log collection program product used for a slave electronic control device, the instructions executable by a computer, the instructions for implementing:

storing information on vehicle time reception state indicating whether or not a vehicle time is received from a master electronic control device, the vehicle time being managed by the master electronic control device to be used in common with the slave electronic control device;

storing device log information that includes (i) a content of an event that is detected, (ii) a device time specific to the slave electronic device when the event is detected, and (iii) information on vehicle time reception state that indicates whether, when the event is detected, the slave electronic control device has already received the vehicle time from the master electronic control device; and setting the vehicle time newly as the updated device time in response to receiving the vehicle time, while changing the information on vehicle time reception state into information indicating a received state of the vehicle time.

\* \* \* \* \*